US005955204A

United States Patent [19]

Yamamoto et al.

[11] Patent Number: 5,955,204

[45] Date of Patent: Sep. 21, 1999

[54] TRANSFER MATERIAL AND TRANSFER PRODUCT

[75] Inventors: Yoshitaka Yamamoto; Yuzou Nakamura; Shigeru Shibata, all of Kyoto, Japan

[73] Assignee: Nissha Printing Co., Ltd., Kyoto-fu, Japan

[21] Appl. No.: 08/705,783

[22] Filed: Aug. 30, 1996

[30] Foreign Application Priority Data

Aug. 31, 1995 [JP] Japan .................................... 7-248849

[51] Int. Cl.$^{6}$ ...................................................... B32B 27/30

[52] U.S. Cl. .......................... 428/500; 503/227; 428/913; 428/914; 428/195

[58] Field of Search .................................... 428/500, 913, 428/914, 195; 503/227

[56] References Cited

U.S. PATENT DOCUMENTS 5,494,885 2/1996 Kudo et al. ............................ 503/227

FOREIGN PATENT DOCUMENTS 2-180909 7/1990 Japan .
3-281685 12/1991 Japan .
7-257012 10/1995 Japan .
8-2192 1/1996 Japan .

OTHER PUBLICATIONS

BASF Technical Data: “UVA 633L” issued Dec. 1, 1989 & “UVA–635L” issued Dec. 6, 1990.

*Primary Examiner*—Margaret G. Moore
*Attorney, Agent, or Firm*—Wenderoth, Lind & Ponack. L.L.P.

[57] ABSTRACT

A transfer material is constituted by including an ultraviolet absorbing layer containing an acrylic high polymer in which a skeleton having an ultraviolet absorbing property is introduced into molecular chains, the ultraviolet absorbing layer being provided on a substrate sheet having a mold-releasability and serving as one constituent layer of a transfer layer of the transfer material. A transfer product is constituted in that the ultraviolet absorbing layer provided on the surface of the product contains an acrylic high polymer in which a skeleton having an ultraviolet absorbing property is introduced to molecular chains.

12 Claims, 9 Drawing Sheets

TRANSFER MATERIAL AND TRANSFER PRODUCT

BACKGROUND OF THE INVENTION

The present invention relates to a transfer material and a transfer product both of which are so excellent in light resistance as to be less likely to yield fading or discoloration even if exposed to ultraviolet rays. More specifically, the present invention relates to a transfer material which is used in forming an outer layer of articles exposed to ultraviolet rays, and a transfer product having a transfer layer of the transfer material. There are as examples of such articles, sports equipment such as fishing goods, electric appliances such as interphones or personal radio-cassette recorders, and automobile inner and outer decorating goods such as air conditioner control panel, wheel covers, center posts, moldings, bumpers, and taillights.

As a method for decorating articles, which are the target of transfer, transfer process has been available. The transfer process is a process that uses a transfer material in which transfer layers such as a release layer, an expression layer, and an adhesive layer have sequentially been formed on a substrate sheet, and that permits decoration to be accomplished by transferring the transfer layers onto the surface of the transfer-target article. As another method for implementing the transfer process more rationally with a transfer-target article composed of a resin mold, concurrent molding-and-transferring process has been available. The concurrent molding-and-transferring process is a process in which, with resin injected and filled into a molding die having a transfer material sandwiched therein, decorating executed by heat pressure due to molding concurrently with the molding of a resin molded product.

For the purpose of imparting a light resistance property to the transfer material, it has been a conventional practice to dissolve an ultraviolet absorbing agent into a release layer or to provide an ultraviolet absorbing layer, which is composed of acrylic resin and an ultraviolet absorbing agent dissolved therein, between the release layer and the pattern layer. As the ultraviolet absorbing agent, benzophenone base or benzotriazole base low-molecular compounds have been used.

However, the conventionally used ultraviolet absorbing agents would be low in the solubility into resin such that the amount to which they can be dissolved into a resin layer such as the release layer or the ultraviolet absorbing layer would be as small as 10% by weight or under. Accordingly, conventional transfer materials have been such that they do not have enough light resistance because a thin film of around the level for use as a transfer material has a low ultraviolet absorption rate of the release layer or the ultraviolet absorbing layer.

The conventionally used ultraviolet absorbing agents would also be poor in compatibility with resin because of their being low-molecular compounds. Accordingly, the conventional transfer materials would incur such problems as variations in the ultraviolet absorption rate or the occurrence of layer separations because the ultraviolet absorbing agent would bleed from within the release layer or the ultraviolet absorbing layer with time so as to be dissipated or eluted into the other layers or molded product.

Furthermore, the conventionally used ultraviolet absorbing agents would lack in heat resistance because they are low-molecular compounds. Accordingly, with the conventional transfer materials, there would be some cases where the ultraviolet absorbing agent in the release layer or the ultraviolet absorbing layer may be volatilized or decomposed by the heating during a transfer process or resin molding process such that the release layer or the ultraviolet absorbing layer may lose the ultraviolet absorbing function.

SUMMARY OF THE INVENTION

Therefore, with a view to eliminating these and other disadvantages, an object of the present invention is to provide a transfer material which has sufficient light resistance and which will never incur variations in the ultraviolet absorption rate or layer separation with time, and in which the ultraviolet absorbing layer will never lose the ultraviolet absorbing function due to the heating during a transfer process or resin molding process. Another object of the invention is to provide a transfer product which has sufficient light resistance and which will never incur variations in the ultraviolet absorption rate or layer separation with time.

In accomplishing these and other objects, according to a first aspect of the present invention, there is provided a transfer material comprising an ultraviolet absorbing layer containing an acrylic high polymer in which a skeleton having an ultraviolet absorbing property is introduced into molecular chains, the ultraviolet absorbing layer being provided on a substrate sheet having a releasability and serving as one constituent layer of a transfer layer of the transfer material.

According to a second aspect of the present invention, there is provided a transfer material comprising an ultraviolet absorbing layer containing an acrylic high polymer in which a 2-hydroxybenzophenone skeleton is introduced into molecular chains, the ultraviolet absorbing layer being provided on a substrate sheet having a releasability and serving as one constituent layer of a transfer layer of the transfer material.

According to a third aspect of the present invention, there is provided a transfer product comprising an ultraviolet absorbing layer formed on a surface of a transfer-target article, the ultraviolet absorbing layer containing an acrylic high polymer in which a skeleton having an ultraviolet absorbing property is introduced into molecular chains.

According to a fourth aspect of the present invention, there is provided a transfer product comprising an ultraviolet absorbing layer formed on a surface of a transfer-target article, the ultraviolet absorbing layer containing an acrylic high polymer in which a 2-hydroxybenzophenone skeleton is introduced into molecular chains.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
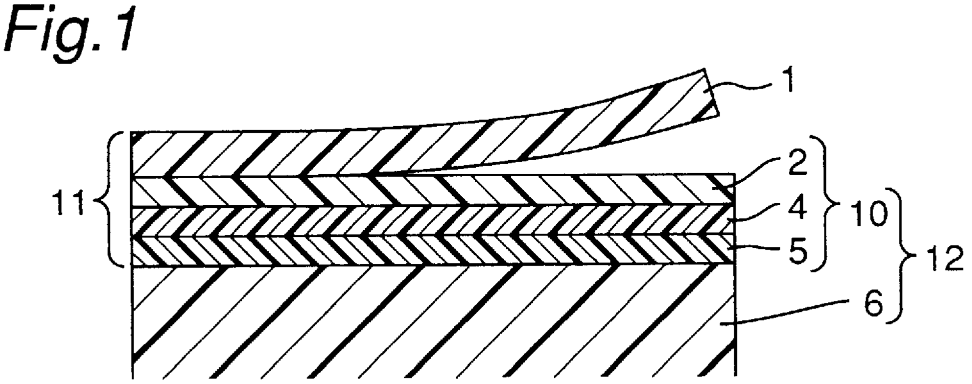
FIG. 1 is a schematic sectional view showing a transfer material and a transfer product according to a first embodiment of the present invention.

Before the description of the present invention proceeds, it is to be noted that like parts are designated by like reference numerals throughout the accompanying drawings.

Hereinbelow, the present invention will be described in more detail with reference to the accompanying drawings.

FIG. 1 is a schematic sectional view showing a transfer material 11 and a transfer product 12 according to a first embodiment of the present invention. The transfer material 11 is constituted by providing a transfer layer 10 on a substrate sheet 1. The transfer layer 10 has, from the substrate sheet side, an ultraviolet absorbing layer 2, an expression layer 4 for expressing characters, figures, patterns, and/or coloring, and an adhesive layer 5 in order. The adhesive layer 5 is adhered to a transfer-target article 6. A release layer 3 is unnecessary because the ultraviolet absorbing layer 2 has a release function.

Figure 2:
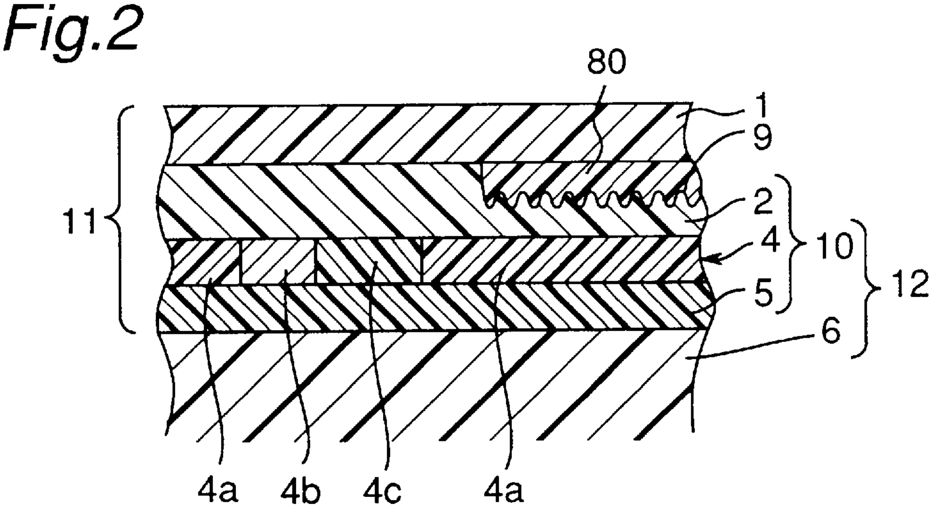
FIG. 2 is a schematic sectional view showing a transfer material and a transfer product according to a second embodiment of the invention.

A transfer material and a transfer product shown in FIG. 2 according to a second embodiment of the present invention are constituted so that a matte layer 80 having a surface processed part 9 is formed on the substrate sheet 1 to implement an embossing onto the transfer layer 10, the expression layer 4 is constituted by combining a pattern layer 4*a*, a metallic pigment containing layer 4*b*, and a semi-transparent colored smoky layer 4*c* with each other, which is different from the first embodiment in FIG. 1. For example, the smoky layer 4*c* gives decoration caused by overlapping the color of the transfer-target article 6 with the semi-transparent color of the smoky layer 4*c*. The metallic pigment containing layer 4*b* has fine metallic particles dispersed into an ink.

Figure 3:
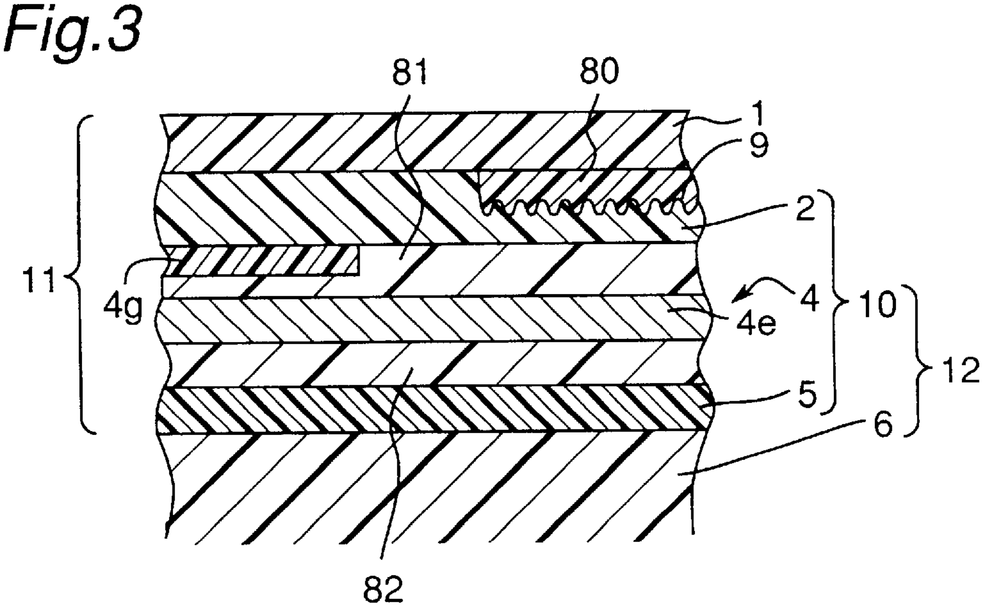
FIG. 3 is a schematic sectional view showing a transfer material and a transfer product according to a third embodiment of the invention.

A transfer material and a transfer product according to a third embodiment of the present invention in FIG. 3 are constituted so that in the transfer material of FIG. 2, the expression layer 4 is constituted by a metallic vaporized layer 4*e* instead of the pattern layer 4*a*, the metallic pigment containing layer 4*b*, and the smoky layer 4*c*. Then, a pre-anchor layer 81 is provided on the front side of the metallic vaporized layer 4*e* to improve an adhesivity between the metallic vaporized layer 4*e* and tie ultraviolet absorbing layer 2, a post-anchor layer 82 is provided on the rear side of the metallic vaporized layer 4*e* to improve an adhesivity between the metallic vaporized layer 4*e* and the adhesive layer 5, and a pattern layer 4*g* is provided at a part of the pre-anchor layer 81 on the ultraviolet absorbing layer side to improve the decorativeness.

Figure 4:
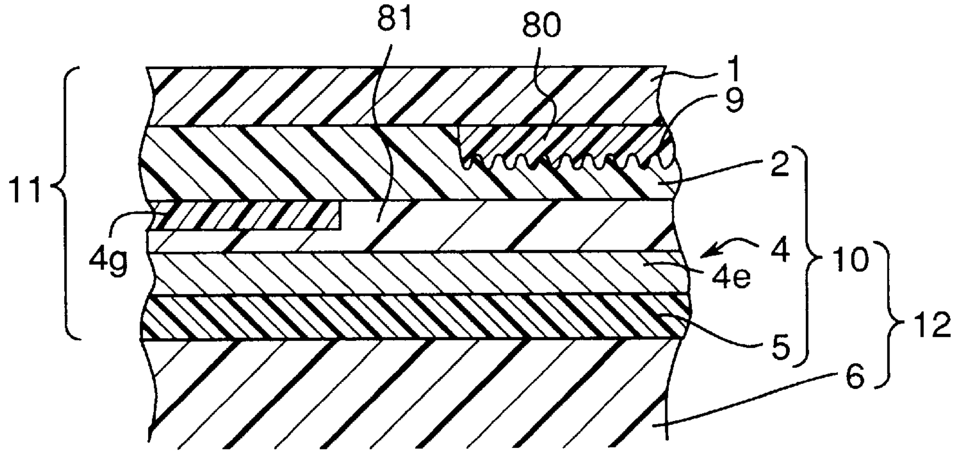
FIG. 4 is a schematic sectional view showing a transfer material and a transfer product according to a fourth embodiment of the present invention.

A transfer material and a transfer product according to a fourth embodiment of the present invention in FIG. 4 are constituted so that in the transfer material of FIG. 3, the post-anchor layer 82 is omitted because there is a good adhesivity between the metallic vaporized layer 4*e* and the adhesive layer 5. As described above, in the present invention, when there is a good adhesivity between the metallic vaporized layer 4*e* and a layer adjacent thereto, the pre- or post- or both anchor layers may be omitted.

Figure 5:
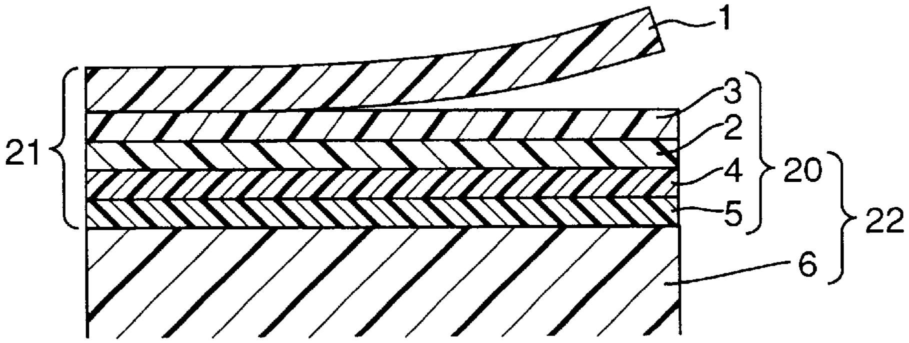
FIG. 5 is a schematic sectional view showing a transfer material and a transfer product according to a fifth embodiment of the invention.

FIG. 5 is a schematic sectional view showing a transfer material 21 and a transfer product 22 according to a fifth embodiment of the present invention. The transfer material 21 is constituted by providing a transfer layer 20 on the substrate sheet 1. The transfer layer 20 has, from the substrate sheet side, the release layer 3, the ultraviolet absorbing layer 2, the expression layer 4, and the adhesive layer 5 in order. That is, the release layer 3 is provided between the ultraviolet absorbing layer 2 and the substrate sheet 1, which is different from the first embodiment.

Figure 6:
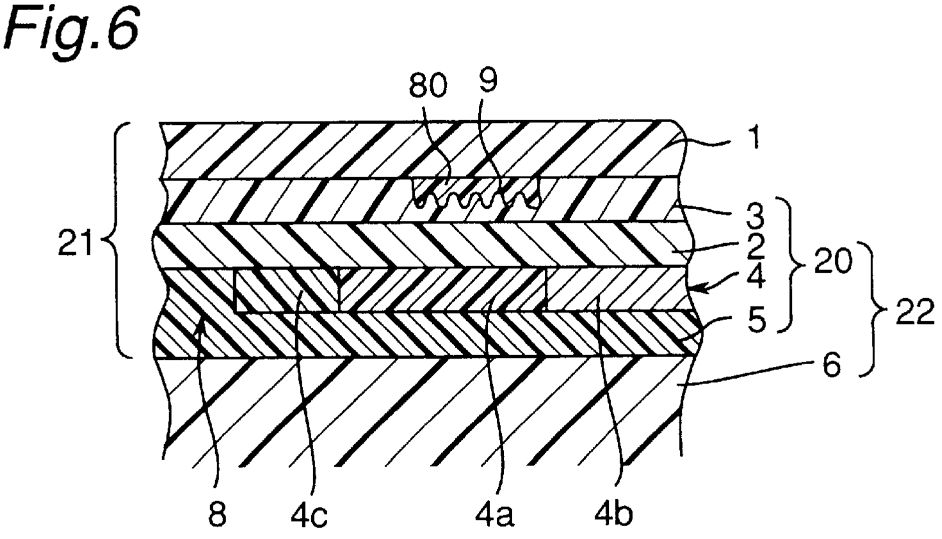
FIG. 6 is a schematic sectional view showing a transfer material and a transfer product according to a sixth embodiment of the invention.

A transfer material and a transfer product according to a sixth embodiment of the present invention in FIG. 6 are constituted so that the matte layer 80 having the surface processed part 9 is formed on the substrate sheet 1, the expression layer 4 is constituted by combining the pattern layer 4*a*, the metallic pigment containing layer 4*b*, and the smoky layer 4*c* with each other, and there is a transparent part 8 where the expression layer 4 is not present and the adhesive layer 5 directly contacts the ultraviolet absorbing layer 2, which is different from the fifth embodiment of FIG. 5.

Figure 7:
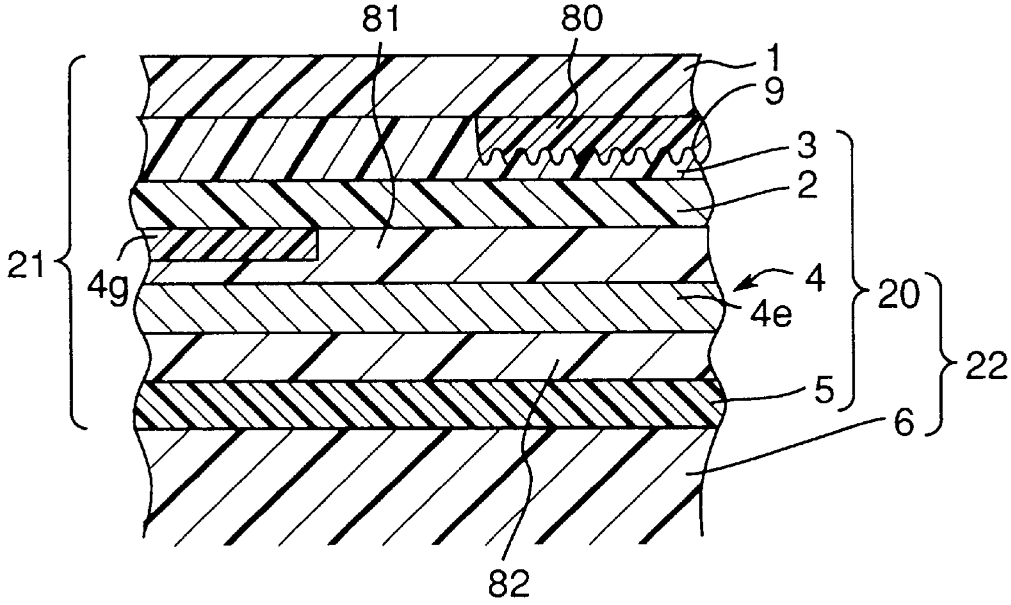
FIG. 7 is a schematic sectional view showing a transfer material and a transfer product according to a seventh embodiment of the present invention.

A transfer material and a transfer product according to a seventh embodiment of the present invention in FIG. 7 are constituted that in the sixth embodiment of FIG. 6, the matte layer 80 having the surface processed part 9 is formed on the substrate sheet 1, the expression layer 4 is constituted by the metallic vaporized layer 4*e* instead of the pattern layer 4*a*, the metallic pigment containing layer 4*b*, and the smoky layer 4*c* as shown in FIG. 2. Then, the pre-anchor layer 81 is provided on the front side of the metallic vaporized layer 4*e* to improve an adhesivity between the metallic vaporized layer 4*e* arid the ultraviolet absorbing layer 2, the post-anchor layer 82 is provided on the rear side of the metallic vaporized layer 4*e* to improve an adhesivity between the metallic vaporized layer 4*e* and the adhesive layer 5, and a pattern layer 4*g* is provided at a part of the pre-anchor layer 81 on the ultraviolet absorbing layer side to improve the decorativeness.

Figure 8:
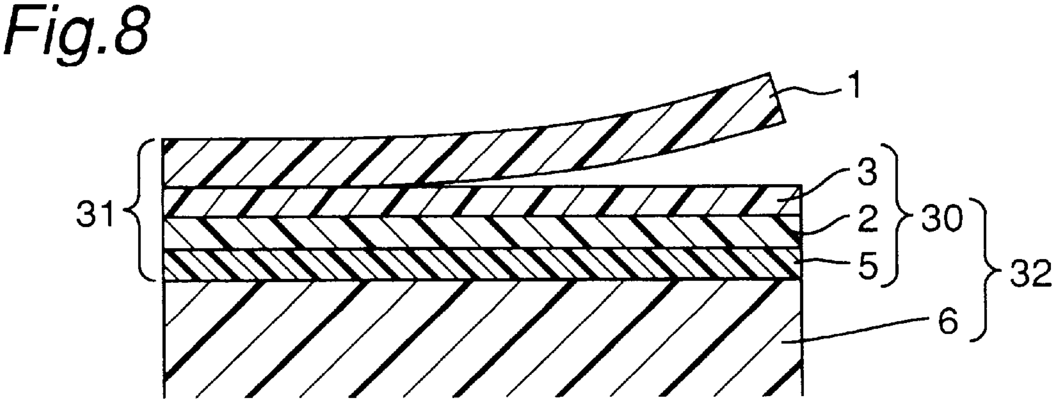
FIG. 8 is a schematic sectional view showing a transfer material and a transfer product according to an eighth embodiment of the invention.

FIG. 8 is a schematic sectional view showing a transfer material 31 and a transfer product 32 according to an eighth embodiment of the present invention. The transfer material 31 is constituted by a transfer layer 30 on the substrate sheet 1. The transfer layer 30 has, from the substrate sheet side, the release layer 3, the ultraviolet absorbing layer 2, and the adhesive layer 5 in order. The adhesive layer 5 is adhered to the transfer-target article 6.

Figure 9:
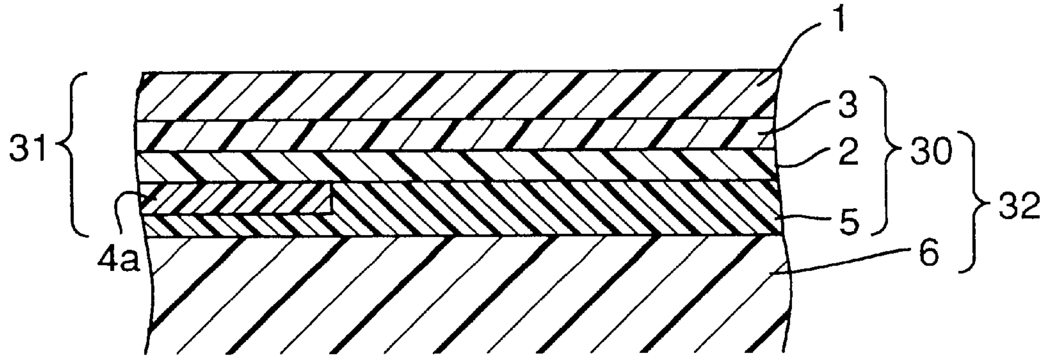
FIG. 9 is a schematic sectional view showing a transfer material and a transfer product according to a ninth embodiment of the invention.

A transfer material and a transfer product according to a ninth embodiment of the present invention in FIG. 9 are constituted so that in the eighth embodiment of FIG. 8, the pattern layer 4*a* is formed at a part of the adhesive layer 5.

Figure 10:
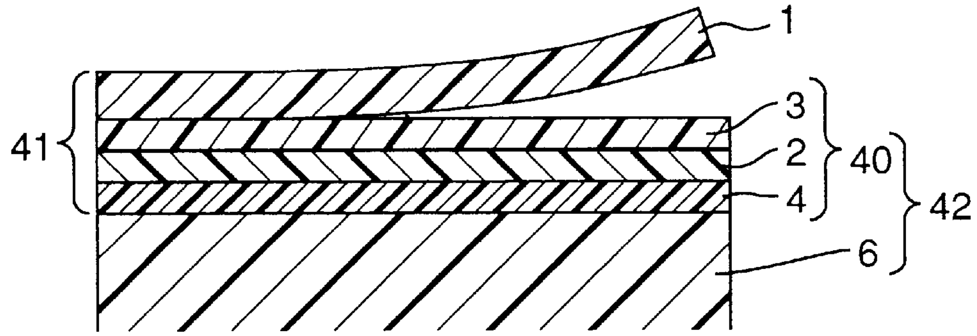
FIG. 10 is a schematic sectional view showing a transfer material and a transfer product according to a tenth embodiment of the present invention.

FIG. 10 is a schematic sectional view showing a transfer material 41 and a transfer product 42 according to a tenth embodiment of the present invention. In this tenth embodiment, the adhesive layer 5 is omitted in the eighth embodiment of FIG. 8 because the expression layer 4 of its transfer layer 40 has an adhering function.

Figure 11:
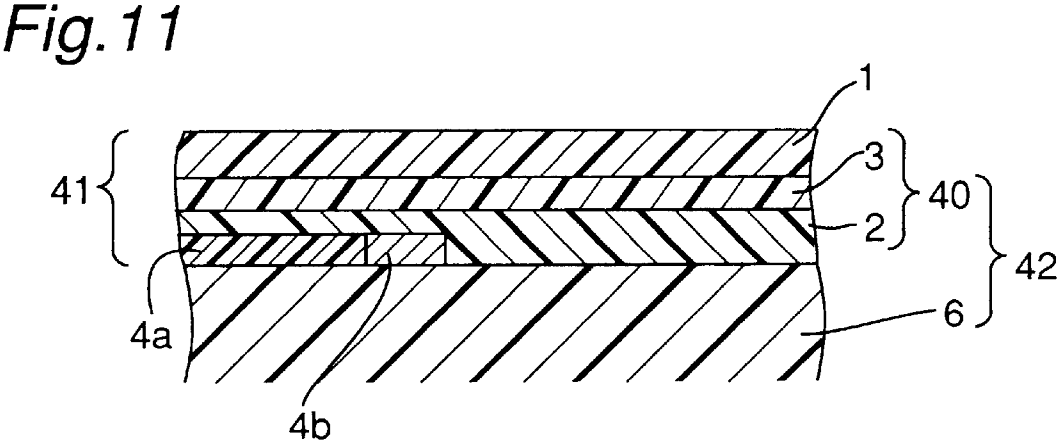
FIG. 11 is a schematic sectional view showing a transfer material and a transfer product according to an eleventh embodiment of the invention.

A transfer material and a transfer product according to an eleventh embodiment of the present invention of FIG. 11 are constituted so that in the tenth embodiment of FIG. 10, the expression layer 4 is not formed on the whole surface of the transfer layer but is formed on a partial surface thereof. That is, the pattern layer 4*a* and the metallic pigment containing layer 4*b* as the expression layer 4 are provided as a part of the ultraviolet absorbing layer 2 on the transfer-target article side, and since each of the ultraviolet absorbing layer 2, the pattern layer 4*a*, and the metallic pigment containing layer 4*b* has an adhering function, the adhesive layer 5 is omitted.

Figure 12:
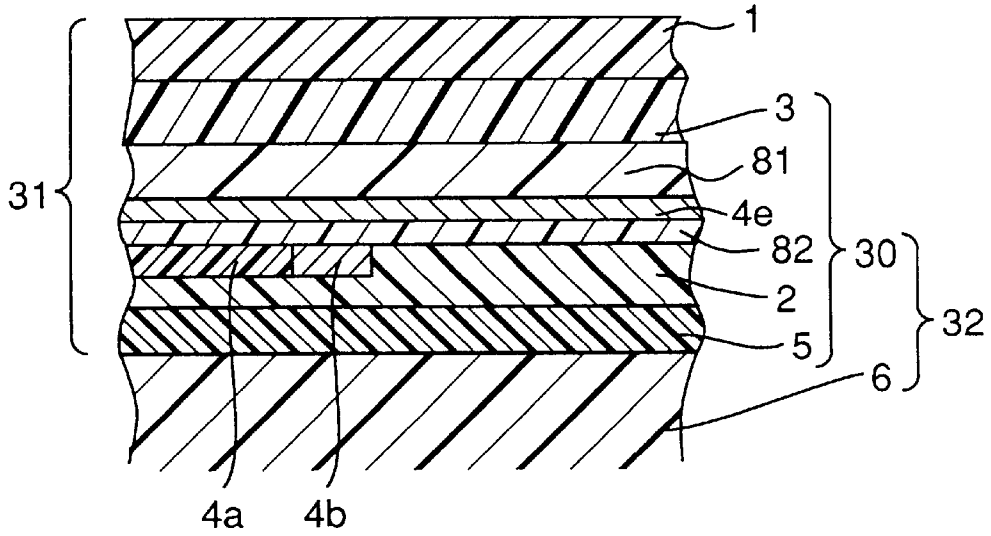
FIG. 12 is a schematic sectional view showing a transfer material and a transfer product according to a twelfth embodiment of the invention.

A transfer material and a transfer product according to a twelfth embodiment of the present invention of FIG. 12 are constituted so that in the eighth embodiment of FIG. 8, the expression layer 4 is provided between the ultraviolet absorbing layer 2 and the release layer 3, the expression layer 4 is constituted by the metallic vaporized layer 4*e*, and the pattern layer 4*a* and the metallic pigment containing layer 4*b* both of which are partially entered the ultraviolet absorbing layer 2. The pre-anchor layer 81 for fixing the metallic vaporized layer 4*e* to the release layer 3 is provided between the release layer 3 and the metallic vaporized layer 4*e*. The post-anchor layer 82 for fixing the metallic vaporized layer 4*e* to the pattern layer 4*a*, the metallic pigment containing layer 4*b*, and the ultraviolet absorbing layer 2 is provided between the metallic vaporized layer 4*e*, and the pattern layer 4*a*, the metallic pigment containing layer 4*b*, and the ultraviolet absorbing layer 2.

Figure 13:
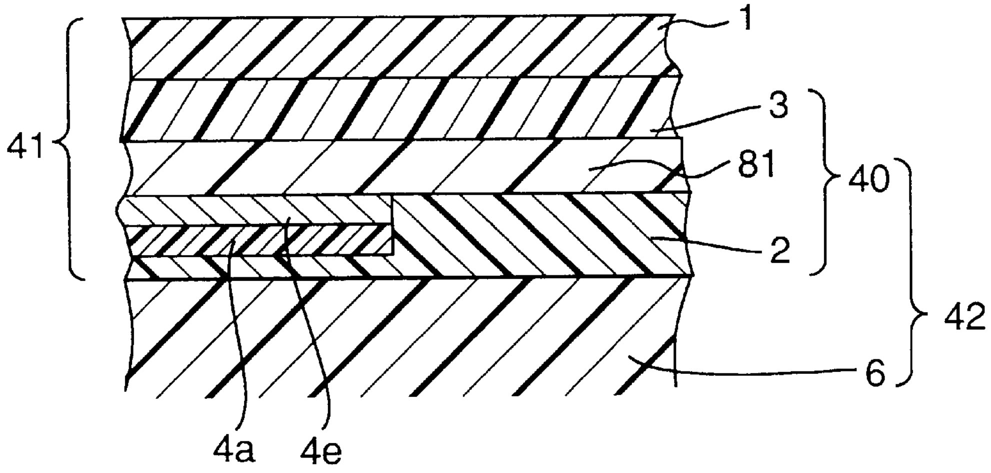
FIG. 13 is a schematic sectional view showing a transfer material and a transfer product according to a thirteenth embodiment of the present invention.

A transfer material and a transfer product according to a thirteenth embodiment of the present invention in FIG. 13 are constituted so that the expression layer 4 is formed at a part of the transfer layer of FIG. 11 and is formed by the metallic vaporized layer 4*e*, the pattern layer 4*a* overlapped on the metallic vaporized layer 4*e*, and the pre-anchor layer 81 provided between the metallic vaporized layer 4*e* and the ultraviolet absorbing layer 2 to improve the adhesivity between the metallic vaporized layer 4*e*, the ultraviolet absorbing layer 2, and the release layer 3.

Figure 14:
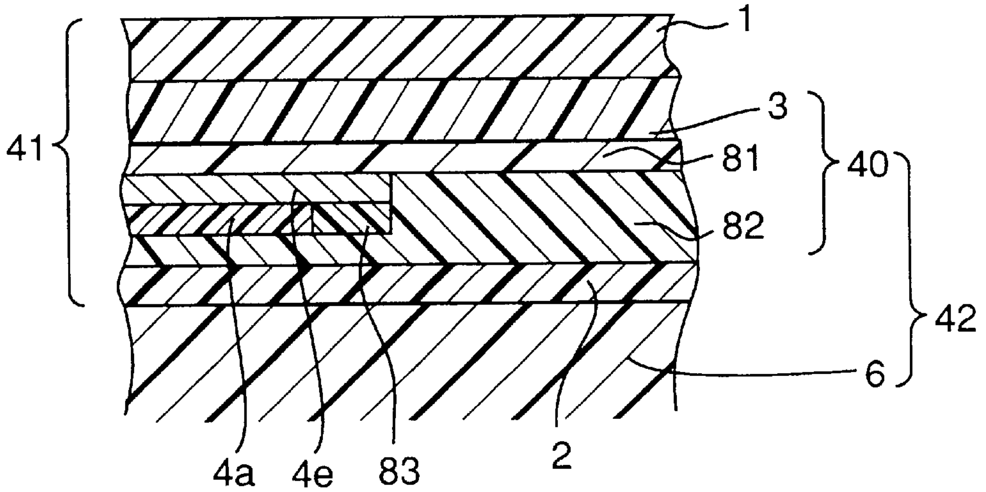
FIG. 14 is a schematic sectional view showing a transfer material and a transfer product according to a fourteenth embodiment of the invention.

A transfer material and a transfer product according to a fourteenth embodiment of the present invention of FIG. 14 are constituted so that in the thirteenth embodiment of FIG. 13, a transparent clear layer 83 is formed as a transparent protective layer at a part of the pattern layer 4*a*, and the pattern layer 4*a* and the transparent clear layer 83 are formed and overlapped on the metallic vaporized layer 4*e* on the transfer-target article 6. The post-anchor layer 82 for fixing the ultraviolet absorbing layer 2 to the pre-anchor layer 81 is provided between the pattern layer 4*a*, the transparent clear layer 83, the pre-anchor layer 81, and the ultraviolet absorbing layer 2.

Figure 15:
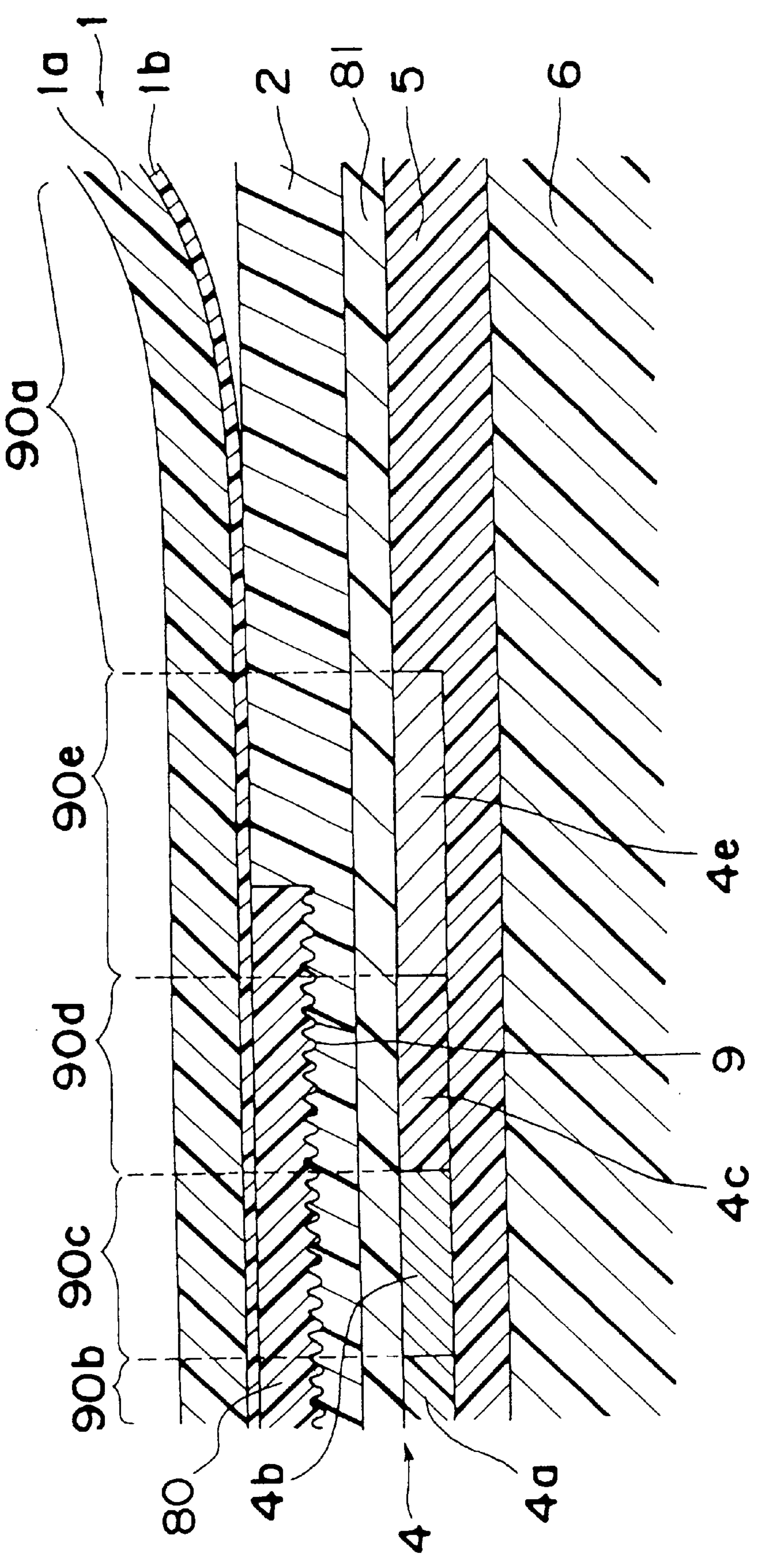
FIG. 15 is a schematic sectional view showing a transfer material and a transfer product according to a fifteenth embodiment of the invention.

FIG. 15 is a schematic sectional view showing more specified examples of a transfer material and a transfer product according to a fifteenth embodiment of the present invention which is constituted based on the first to fourth embodiments. In the fifteenth embodiment, the substrate sheet 1 comprises a main body 1*a* and a release aided layer 1*b* formed on the main body 1*a*. The ultraviolet absorbing layer 2 is provided on the release aided layer 1*b* of the substrate sheet 1. Furthermore, in this embodiment, there are provided the matte layer 80 formed at a part of the ultraviolet absorbing layer 2 on the substrate sheet side and having the surface processed part 9; the expression layer 4 partially provided on the anchor layer 81; and the adhesive layer 5 provided on the expression layer 4 and provided on the anchor layer 81 at a portion where the expression layer 4 is not present. The expression layer 4 comprises: the pattern layer 4*a*; the metallic pigment containing layer 4*b*; the smoky layer 4*c*; and the metallic vaporized layer 4*e*. Then, a transparent part 90*a* is formed at a portion where the expression layer 4 is not present. A pattern part 90*b* is formed at a portion where the expression layer 4 is of the pattern layer 4*a*. A metallic part 90*c* is formed at a portion where the expression layer 4 is of the metallic pigment containing layer 4*b*. A smoky part 90*d* is formed at a portion where the expression layer 4 is of the smoky layer 4*c*. A metallic vaporized part 90*e* is formed at a portion where the expression layer 4 is of the metallic vaporized layer 4*e*.

Figure 16:
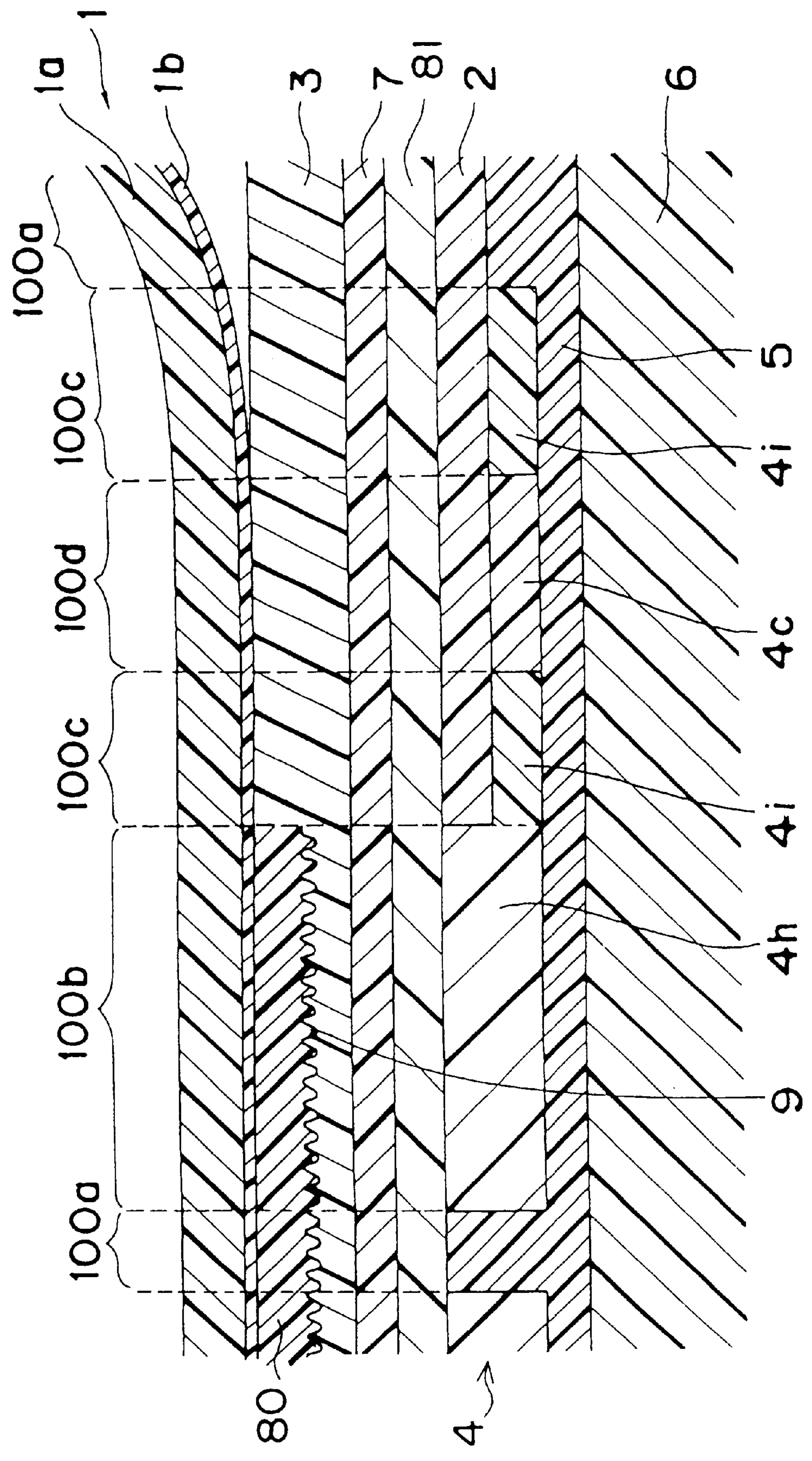
FIG. 16 is a schematic sectional view showing a transfer material and a transfer product according to a sixteenth embodiment of the present invention.

FIG. 16 is a schematic sectional view showing more specified examples of a transfer material and a transfer product according to a sixteenth embodiment of the present invention which is constituted based on the fifth to ninth embodiments. In the sixteenth embodiment, the substrate sheet 1 comprises the main body 1*a* and the release aided layer 1*b* formed on the main body 1*a*. Furthermore, in this embodiment, there are provided the release layer 3 provided on the release aided layer 1*b* of the substrate sheet 1; the matte layer 80 formed at a part of the release layer 3 on the substrate sheet side and having the surface processed part 9; a hard coating layer 7 provided on the release layer 3; the anchor layer 81 provided on the hard coating layer 7; the ultraviolet absorbing layer 2 partially provided on the anchor layer 81; the expression layer 4 partially provided on the ultraviolet absorbing layer 2 and partially provided on the anchor layer 81 at a portion where the ultraviolet absorbing layer 2 is not present; and the adhesive layer 5 provided on the expression layer 4 and provided on the anchor layer 81 or the ultraviolet absorbing layer 2 at a portion where the expression layer 4 is not present. The anchor layer 81 is provided to improve an adhesivity between the hard coat layer 7 and the ultraviolet absorbing layer 2. The expression layer 4 comprises: a first pattern layer 4*h* provided on a part of the anchor layer 81 at a portion corresponding to the surface processed part 9 of the matte layer 80; a second pattern layer 4*i* provided on a part of the ultraviolet absorbing layer 2 provided on a part of the anchor layer 81 and formed by a gravure printing; and the smoky layer 4*c* provided on a part of the ultraviolet absorbing layer 2 provided on a part of the anchor layer 81. Then, a transparent part 100*a* is formed at a portion where the expression layer 4 is not present. A matte pattern part 100*b* is formed at a portion where the expression layer 4 is of the first pattern layer 4*h*. A glazing pattern part 100*c* is formed at a portion where the expression layer 4 is of the second pattern layer 4*i*. A smoky part 100*d* is formed at a portion where the expression layer 4 is of the smoky layer 4*c*.

Figure 17:
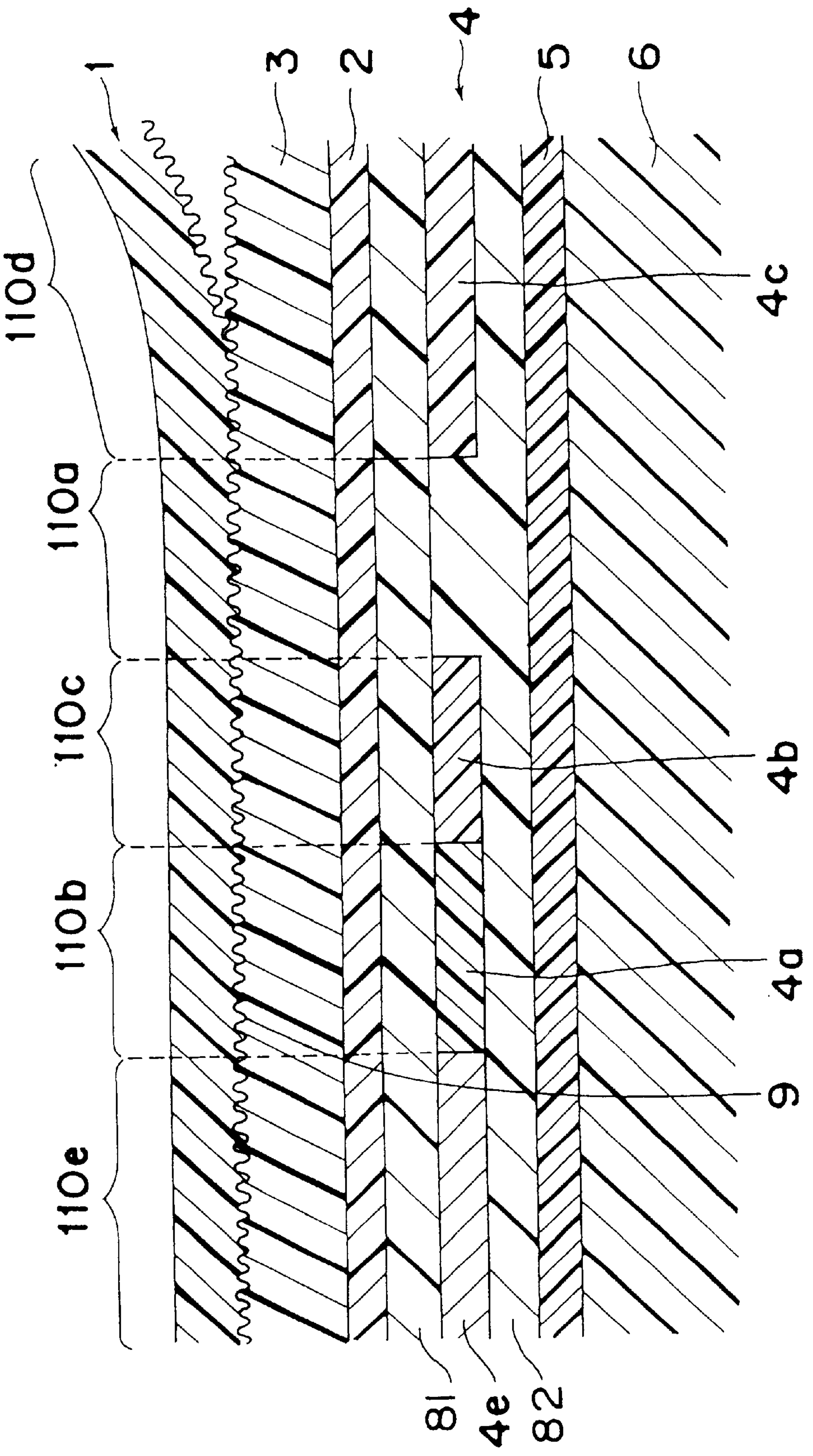
FIG. 17 is a schematic sectional view showing a transfer material and a transfer product according to a seventeenth embodiment of the invention.

FIG. 17 is a schematic sectional view showing more specified examples of a transfer material and a transfer product according to a seventeenth embodiment of the present invention which is constituted based on the fifth to ninth embodiments. In the seventeenth embodiment, the substrate sheet 1 is surface-processed on the whole surface by embossing process as shown by the reference numeral 9. Furthermore, in this embodiment, there are provided the release layer 3 provided on the substrate sheet 1; the ultraviolet absorbing layer 2 provided on the release layer 3; a pre-anchor layer 81 provided on the ultraviolet absorbing layer 2; the expression layer 4 partially provided on the pre-anchor layer 81; a post-anchor layer 82 provided on the expression layer 4 and provided on the pre-anchor layer 81 at a portion where the expression layer 4 is not present; and the adhesive layer 5 provided on the post-anchor layer 82. The expression layer 4 comprises: the pattern layer 4*a*; the metallic pigment containing layer 4*b*; the smoky layer 4*c*; and the metallic vaporized layer 4*e*. Then, a transparent part 110*a* is formed at a portion where the expression layer 4 is not present. A pattern part 110*b* is formed at a portion where the expression layer 4 is of the pattern layer 4*a*. A metallic part 110*c* is formed at a portion where the expression layer 4 is of the metallic pigment containing layer 4*b*. A smoky part 110*d* is formed at a portion where the expression layer 4 is of the smoky layer 4*c*. A metallic vaporized part 100*e* is formed at a portion where the expression layer 4 is of the metallic vaporized layer 4*e*.

Figure 18:
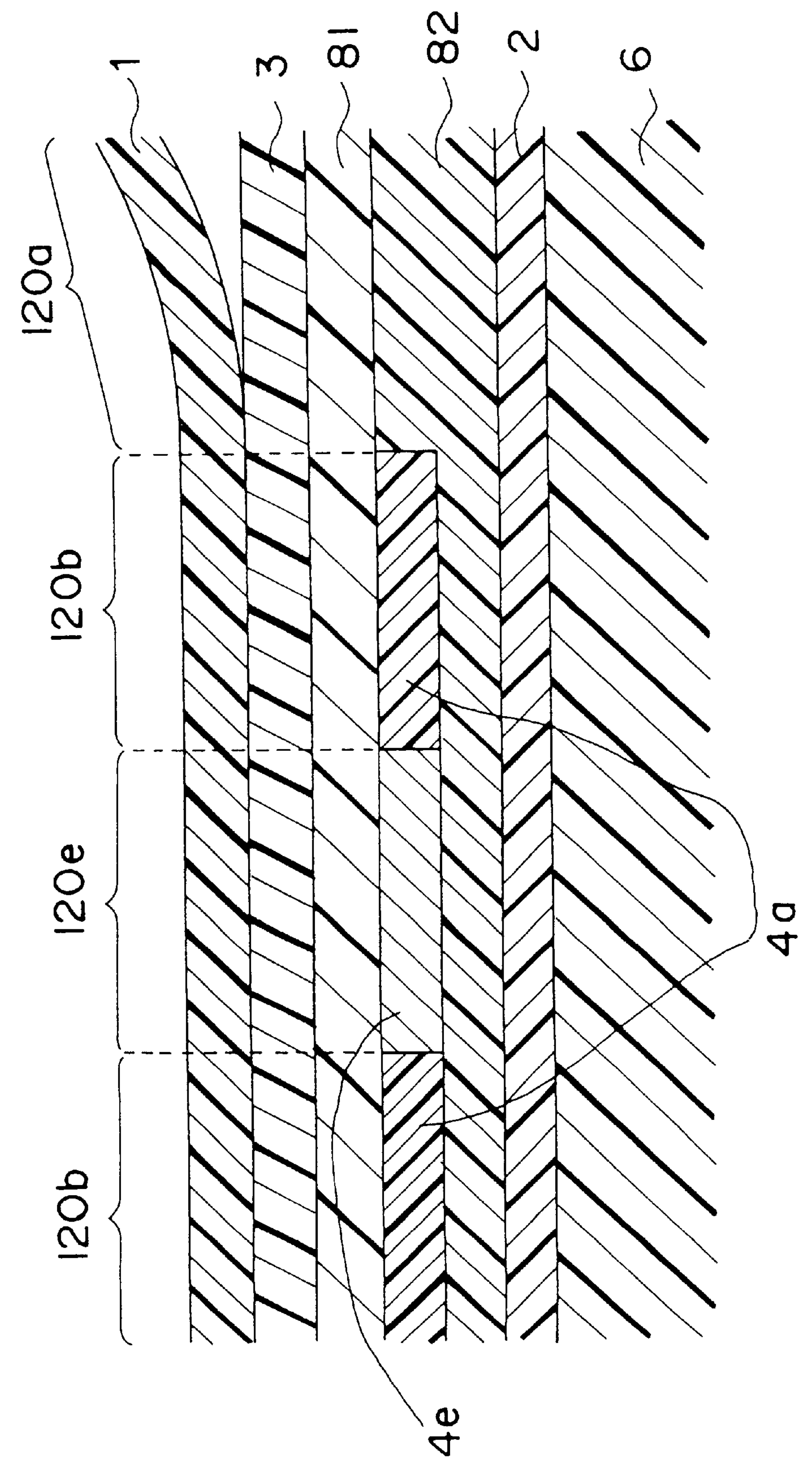
FIG. 18 is a schematic sectional view showing a transfer material and a transfer product according to a eighteenth embodiment of the invention.

FIG. 18 is a schematic sectional view showing more specified examples of a transfer material and a transfer product according to an eighteenth embodiment of the present invention which is constituted based on the eleventh to fourteenth embodiments. In the eighteenth embodiment, there are provided the release layer 3 provided on the substrate sheet 1; the pre-anchor layer 81 provided on the release layer 3; the expression layer 4 partially provided on the pre-anchor layer 81; a post-anchor layer 82 provided on the expression layer 4 and provided on the pre-anchor layer 81 at a portion where the expression layer 4 is not present; and the ultraviolet absorbing layer 2 provided on the post-anchor layer 82 and having an adhering function to the transfer-target article 6. The expression layer 4 comprises the pattern layer 4*a* and the metallic vaporized layer 4*e*. Then, a transparent part 120*a* is formed at a portion where the expression layer 4 is not present. A pattern part 120*b* is formed at a portion where the expression layer 4 is of the pattern layer 4*a*. A metallic vaporized part 120*e* is formed at a portion where the expression layer 4 is of the metallic vaporized layer 4*e*.

The transfer materials according to the first through eleventh embodiments and fifteenth through seventeenth embodiments are so constructed that each expression layer 4 is arranged on the transfer-target article side from the ultraviolet absorbing layer 2 because those embodiments are of a type where the transfer-target article 6 is viewed from the transfer layer. On the other hand, the transfer materials according to the twelfth through fourteenth embodiments and the eighteenth embodiment are so constructed that the transfer-target article 6 is transparent and each ultraviolet absorbing layer 2 is arranged on the transfer-target article side from the expression layer 4 because those embodiments are of a type where the transfer layer is viewed through the transfer-target article 6.

Hereinbelow, each layer constituting each of the transfer layers 10, 20, 30, 40 of each of the embodiments will be described.

In each of the embodiments, the substrate sheet 1 having a mold releasability may be given by any of those which are commonly used as a substrate sheet for transfer material and which include: resin sheets of polypropylene resin, polyethylene resin, polyamide resin, polyester resin, acrylic resin, polyvinyl chloride resin, and the like; metal foils such as aluminum foils or copper foils; cellulosic sheets such as glassine paper, coated paper, and cellophane; and composites of these sheets.

Given good releasability of the transfer layers 10, 20, 30, 40 from the substrate sheet 1, it is allowed to provide the transfer layers 10, 20, 30, 40 directly onto the substrate sheet 1 (see FIGS. 1–14 and 17). In order to improve the releasability of the transfer layer from the substrate sheet 1, the release aided layer 1*b* may be provided over the entire surface before providing the transfer layer on the main body 1*a* of the substrate sheet 1 (see FIGS. 15, 16, and 18). The release aided layer 1*b* will be released from the transfer layer together with the substrate sheet 1 when the substrate sheet 1 is released after the transfer process or the concurrent molding-and-transferring process. As the material of the release aided layer 1b, available are melamine resin release aided agents, urethane resin release aided agents, silicone resin release aided agents, fluororesin release aided agents, cellulosic release aided agents, urea resin release aided agents, polyolefin resin release aided agents, paraffinic release aided agents, and composite release aided agents of these release aided agents. As the method for forming the release aided layer 1*b*, available are coating processes such as roll coating and spray coating, and printing processes such as gravure printing and screen printing.

The release layer 3 is formed entirely or partially on the substrate sheet 1 or the release aided layer 1*b*. The release layer 3 is a layer that will form the outermost surface of the transfer-target article 6 by being released from the substrate sheet 1 or the release aided layer 1*b* when the substrate sheet 1 is released after the transfer process or the concurrent molding-and-transferring process (see FIGS. 5–14, and 16–18). As the material of the release layer 3, appropriately usable are acrylic resins, polyester resins, polyvinyl chloride resins, cellulosic resins, rubber resins, polyurethane resins, polyvinyl acetate resins, and the like, as well as copolymers such as vinyl chloride—vinyl acetate copolymer resins or ethylene—vinyl acetate copolymer resins. When the release layer 3 is required to have some hardness, it is proper to selectively use photo-setting resins such as ultraviolet curing resins, radio-curing resins such as electron-beam curing resins, thermosetting resins, and the like. As the method for forming the release layer 3, available are coating processes such as gravure coating, roll coating, and a method of coating with the use of a comma coater ("comma" is a trademark of Hiranotekushiito), and printing processes such as gravure printing and screen printing. In addition, when the ultraviolet absorbing layer 2 has a releasability with respect to the substrate sheet 1 or the release aided layer 1b, the release layer 3 does not necessarily need to be provided (see FIGS. 1–4 and 15).

The ultraviolet absorbing layer 2 will form one constituent layer of each of the transfer layers 10, 20, 30, 40. The ultraviolet absorbing layer 2 absorbs ultraviolet rays when each of the transfer products 12, 22, 32, 42 is exposed to ultraviolet rays after the transfer process, thereby protecting its lower-adjacent expression layer 4 and the transfer-target article 6 from the ultraviolet rays. The expression layer 4 and the transfer-target article 6 are protected from ultraviolet rays by the ultraviolet absorbing layer 2 so that fading and discoloration are less likely to occur. Thus, the light resistance of the transfer products 12, 22, 32, 42 is enhanced.

The ultraviolet absorbing layer 2 of the present invention is characterized by containing an acrylic high polymer in which a skeleton having an ultraviolet absorbing property is introduced into molecular chains. That is, because the skeleton having an ultraviolet absorbing property is introduced as molecular chains of the acrylic high polymer, it is possible to introduce as much as 20–80% by weight of skeleton. Therefore, as compared with the conventional release layers or ultraviolet absorbing layers in which benzophenone base or benzotriazole base low-molecular compounds as an ultraviolet absorbing agent is dissolved in resin layers, the ultraviolet absorbing layer 2 of the invention has an extremely high ultraviolet absorption rate. Also, the skeleton having an ultraviolet absorbing property, which is introduced as molecular chains of an acrylic high polymer, is very stable and almost free from variations with time. Further, as compared with the conventional release layers or ultraviolet absorbing layers in which benzophenone base or benzotriazole base low-molecular compounds as an ultraviolet absorbing agent are dissolved in resin layers, the ultraviolet absorbing layer 2 of the invention is very stable and excellent in heat resistance. The ultraviolet absorbing layer 2, whose decomposition temperature is above about 270° C., is enough resistant to the heating in the transfer process and resin molding process. The skeleton having an ultraviolet absorbing property is typified by the 2-hydroxybenzophenone skeleton. More specifically, it is exemplified by 2-hydroxy-4-(methacryloyloxyethoxy) benzophenone, 2-hydroxy-4-methacryloyloxybenzophenone, and 2-hydroxy-4-(2-hydroxy-3-methacryloyloxy)propoxybenzophenone.

There are two ways in which the ultraviolet absorbing layer 2 is composed. In one way, the ultraviolet absorbing layer 2 contains only the acrylic high polymer in which a skeleton having an ultraviolet absorbing property is introduced into molecular chains. In the other way, the ultraviolet absorbing layer 2 contains an acrylic high polymer in which a skeleton having an ultraviolet absorbing property is introduced into molecular chains, and other resins in mixture. Resins to be mixed are, for example, polyvinyl resins, polyamide resins, polyester resins, acrylic resins, polyurethane resins, polyvinyl acetal resins, polyester urethane resins, cellulosic ester resins, and alkyd resins. When the ultraviolet absorbing layer 2 is required to have some hardness, it is proper to selectively use two-liquid curing resins, electron-beam curing resins, thermosetting resins, and the like. As required, a curing agent may be mixed in the ultraviolet absorbing layer 2 or a thermoplastic resin may be mixed therein, so as to improve the releasability. It is preferable that the thickness of the ultraviolet absorbing layer 2 is one to five times larger than that of the anchor layer. If the thickness is, by less than one time, larger than the anchor layer, the ultraviolet absorbing layer 2 has insufficient ultraviolet absorbing function. If the thickness is, by more than five times, larger than the anchor layer, it is difficult to form the ultraviolet absorbing layer 2 by printing or coating process. For example, when the layer adjacent to the ultraviolet absorbing layer 2 is an anchor layer of a thickness of 0.87±0.13 g/m$^2$, the thickness of the ultraviolet absorbing layer 2 is 2.01±0.30 g/m$^2$, preferably.

When the ultraviolet absorbing layer 2 has a releasability from the substrate sheet 1 or the release aided layer 1*b*, the ultraviolet absorbing layer 2 may be provided directly onto the substrate sheet 1 or the release aided layer 1*b* without providing the release layer 3 (see FIGS. 1–4 and 15) In this case, the ultraviolet absorbing layer 2 will be the outermost surface of the transfer-target article 6 by being released from the substrate sheet 1 or the release aided layer 1*b* when the substrate sheet 1 is released after the transfer process or the concurrent molding-and-transferring process. As the method for forming the ultraviolet absorbing layer 2, available are coating processes such as gravure coating, roll coating, and a method of coating with the use of a comma coater ("comma" is a trademark of Hiranotekushiito), and printing processes such as gravure printing and screen printing.

The expression layer 4 is formed on the ultraviolet absorbing layer 2 normally as a printing layer. As the material of the printing layer, it is appropriate to use a coloring ink which contains a pigment or dye of an appropriate color as a coloring agent and which takes, as a binder, a resin such as polyvinyl resins, polyamide resins, polyester resins, acrylic resins, polyurethane resins, polyvinyl acetal resins, polyester urethane resins, cellulosic ester resins, and alkyd resins. The expression layer 4 expresses characters, figures, patterns, and/or coloring to give decorativeness to the transfer products 12, 22, 32, 42. In addition, because coloring inks containing a dye as a coloring agent is particularly weak in light resistance, there will appear particularly remarkable protective effect by the ultraviolet absorbing layer 2. The expression layer 4 can be improved a little in its light resistance by mixing a stabilizing agent such as epoxidized fatty oil. As the method for forming the printing layer, it is appropriate to use a normal printing process such as offset printing, gravure printing, and screen printing. In particular, for multi-color printing or gradated expression, the offset printing or the gravure printing is suitable. For monocolor, also usable are coating processes such as gravure coating, roll coating, and a method of coating with the use of a comma coater ("comma" is a trademark of Hiranotekushiito). The printing layer may be provided either entirely or partially, depending on the pattern to be expressed. The expression layer 4 may also be formed from a metal thin film layer such as a metallic pigment containing layer or a layer formed by metallic vaporized or metallic half vaporized, a layer containing pearl pigment, or a layer from a combination of a printing layer and a metal thin film layer. The expression layer 4 may be constituted by a transparent colorless layer or an anchor layer.

The adhesive layer 5 is to adhere the foregoing individual transfer layer 10, 20, 30, 40 to the surface of the transfer-target article 6. The adhesive layer 5 is formed at the area to be adhered. That is, if the area to be adhered is the entire surface of the transfer-target article 6, then the adhesive layer 5 is formed entirely on the expression layer 4. If the area to be adhered is partial, the adhesive layer 5 is formed partially on the expression layer 4. As the adhesive layer 5, a heat-sensitive or pressure-sensitive resin suitable for the material of the transfer-target article 6 is used as required. For example, acrylic resin may be used appropriately when the material of the transfer-target article 6 is acrylic resin. Also, when the material of the transfer-target article 6 is a polyphenylene oxide-polystyrene resin, polycarbonate resin, styrene copolymer resin, or polystyrene blend resin, it is appropriate to use acrylic resin, polystyrene resin, polyamide resin, or the like compatible with those resins. Further, when the material of the transfer-target article is polypropylene resin, usable are chlorinated polyolefin resin, chlorinated ethylene-vinyl acetate copolymer resin, cyclized rubber, and coumarone-indene resin. As the method for forming the adhesive layer 5, available are coating processes such as gravure coating, roll coating, and a method of coating with the use of a comma coater ("comma" is a trademark of Hiranotekushiito), and printing processes such as gravure printing and screen printing.

The constitution of the transfer layers 10, 20, 30, 40 is not limited to the above-described embodiments. For example, with the use of the transfer material 30 which is intended to utilize the ground pattern or transparency of the transfer-target article 6 and to protect these from ultraviolet rays, the expression layer 4 may be omitted (see FIG. 8, and the transparent parts 90*a*, 100*a*, 110*a*, 120*a* in FIGS. 15–18). Also, when the material of the expression layer 4 or the ultraviolet absorbing layer 2 is one excellent in the adherence characteristic relative to the transfer-target article 6, the adhesive layer 5 may be omitted (see FIGS. 12–14 and 18).

The transfer-target article 6, the material of which is not limitative, may be exemplified particularly by resin molded products, wooden products, or their composite products. These products may be transparent, semi-transparent, or opaque. The transfer-target article 6 may be either colored or not colored. The resin is exemplified by general-purpose resins such as polystyrene resin, polyolefin resin, ABS resin, and AS resin. It is also possible to use general-purpose engineering resins, such as polyphenylene oxide—polystyrene resin, polycarbonate resin, polyacetal resin, acrylic resin, polycarbonate modified polyphenylene ether resin, polybutylene terephthalate resin, and ultra-high-molecular-weight polyethylene resin, or super-engineering resins such as polysulfonic resin, polyphenylene sulfide resin, polyphenylene oxide resin, polyether imide resin, polyimide resin, liquid crystal polyester resin, and polyallyl heat-resistant resins. Further, composite resins to which a reinforcement material such as glass fiber or inorganic filler is added may also be used.

Now explained is the method of obtaining a transfer products 12, 22, 32, 42 of the present invention by using the transfer materials 11, 21, 31, 41 having layer constructions as described above. First, the adhesive layer 5 or the expression layer 4 or the ultraviolet absorbing layer 2 of each transfer material 11, 21, 31, 41 is put into close contact with the surface of each transfer-target article 6. Next, by using a transfer machine, such as a roll transfer machine or an up-down transfer machine, equipped with a heat-resistant rubber-like elastic material, for example, silicon rubber, heat and pressure are applied from the substrate sheet side of each of the transfer materials 11, 21, 31, 41 via the heat-resistant rubber-like elastic material set to conditions of a temperature of around 80 to 260° C. and a pressure of around 50 to 200 $kg/m^2$. By doing so, the adhesive layer 5 or the expression layer 4 or the ultraviolet absorbing layer 2 is adhered to the surface of the transfer-target article 6. Finally, when the substrate sheet 1 is released after cooling, there occurs a release at the interface between the substrate sheet 1 and the release layer 3 or the ultraviolet absorbing layer 2, where the transfer process is completed. Otherwise, as shown in FIGS. 15 and 16, with the release aided layer 1*b* provided on the substrate sheet 1, when the substrate sheet 1 is released, there occurs a release at the interface between the release aided layer 1*b* and the release layer 3 or the ultraviolet absorbing layer 2, where the transfer process is completed.

Furthermore, in the type where the transfer layer is viewed through the transfer-target article 6, there are a case (see FIG. 18) where when the substrate sheet 1 is released, there occurs a release at the interface between the substrate sheet or the release aided layer 1*b* and the release layer 3, and a case (not shown) where when the substrate sheet is released, there occurs a release at the interface between the substrate sheet or the release aided layer and the anchor layer, the expression layer, or the ultraviolet absorbing layer, etc.

Next discussed is a process of decorating the surface of a resin molded product, which is a transfer-target article 6, with each of the above transfer materials 11, 21, 31, 41 and by using the concurrent molding-and-transferring process through injection molding. First, the transfer material is fed into a mold composed of a movable die and a fixed die. This may be done either by feeding a sheet-like transfer material sheet by sheet, or by intermittently feeding a longer transfer material in steps of necessary portions. When a longer transfer material is used, it is recommendable to register positioning marks of the expression layer 4 or the transfer layer of the transfer material with positioning marks of the mold by using a feeder having a positioning mechanism. Also, for intermittently feeding a transfer material, it is convenient to fix the transfer material with the movable die and the fixed die after the position of the transfer material is detected by a sensor, because the transfer material can be fixed always at the same position so that the expression layer 4 or the transfer layer can be prevented from any positional shift. After the mold is closed, molten resin is injected and filled into the mold through a gate provided in the fixed die, by which the transfer-target article 6 is formed and, concurrently, each of the transfer materials 11, 21, 31, 41 is adhered to its surface. The resin molded product, which is the transfer-target article 6, is cooled and then taken out by opening the mold. Finally, the substrate sheet 1 is released, by which the transfer process is completed.

In the embodiments, as the method for surface-processing on the release surface of each of the transfer layers 10, 20, 30, and 40 when the substrate sheet 1 is released, there are provided a method for previously forming the matte layer 80 on the whole surface (not shown) or a partial surface of the substrate sheet 1 (see FIGS. 2–4, 6, 7, 15, and 16), and a method for directly embossing on the whole surface of the substrate sheet 1 (see FIG. 17). The matte layer 80 contains pigments therein to form the surface processed part 9 on its surface and is fixed to the substrate sheet 1. Therefore, in the method for previously forming the matte layer 80 on the whole surface or a partial surface of the substrate sheet 1, when the substrate sheet 1 is released from the transfer layer, the matte layer 80 is released together with the substrate sheet 1 from the transfer layer, only the surface processed shape of the surface of the matte layer 80 is left onto the release layer of the transfer layer to perform surface-processing. In the method for directly embossing on the whole surface of the substrate sheet 1, the embossing process is performed on the surface of the substrate sheet 1 in any shape, for example, hairlines shape such as scratches or a spun shape of concentric circles so as to form surface-processing on the whole surface of the substrate sheet 1, so that when the substrate sheet 1 is released from the transfer layer, only the surface processed shape of the surface of the substrate sheet 1 is left onto the release layer of the transfer layer to perform surface-processing.

EXAMPLE 1

With a polyethylene terephthalate resin film used as the substrate sheet, sequentially printed on the substrate sheet were acrylic resin as the release layer, [2-hydroxy-4-(methacryloyloxyethoxy)benzophenone]/methacrylate methyl copolymer as the ultraviolet absorbing layer, an acrylic ink containing a colorant of C.I. solvent black 27 dye as the expression layer, and chlorinated ethylene—vinyl acetate copolymer resin as the adhesive layer, by which a transfer material was obtained. In addition, the polymerization ratio of [2-hydroxy-4-(methacryloyloxyethoxy) benzophenone]/methacrylate methyl copolymer was 50/50 in percent by weight. With this transfer material, concurrently when a resin molded product, which is a transfer-target article, was fabricated by the concurrent molding-and-transferring process, the transfer to its surface was carried out. Then the substrate sheet was released, by which a transfer product was obtained (see FIG. 5). The molding conditions in this process were a resin temperature of 220° C., a mold temperature of 55° C., and a resin pressure of about 300 kg/cm$^2$. The molded product was formed into a tray shape having a 10 cm square size, a 10 mm rising edge, and a 3 mm corner radius, with a transparent acrylic resin.

EXAMPLE 2

On the substrate sheet, sequentially printed was a transfer layer of the same constitution as in Example 1, except the release layer, by which a transfer material was obtained. By using this transfer material, a transfer product of the same shape was obtained as in Example 1 (see FIG. 1).

Comparative Example

Figure 19:
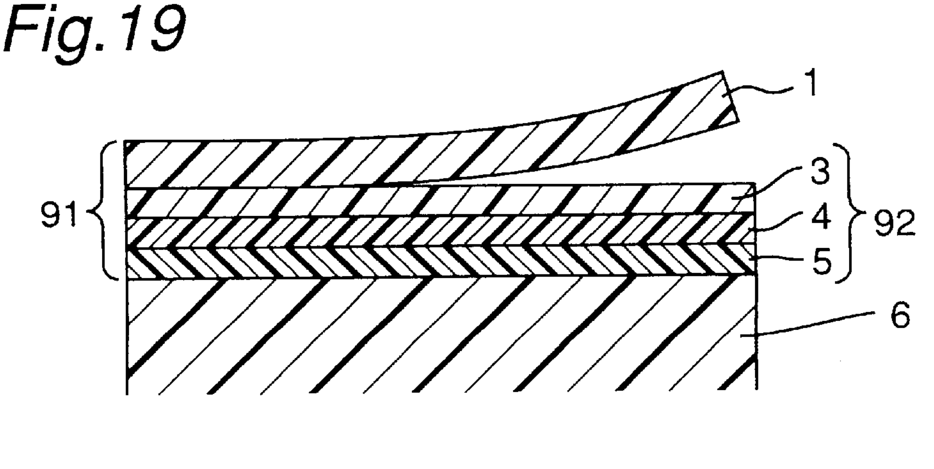
FIG. 19 is a schematic sectional view showing the transfer material and transfer product of a comparative example.

On the substrate sheet, sequentially printed was a transfer layer 91 of the same constitution as in Example 1, except the ultraviolet absorbing layer, by which a transfer material was obtained. By using this transfer material, a transfer product 92 of the same shape was obtained as in Example 1 (see FIG. 19).

TABLE 1

| | Light transmittance at masked part | Light-transmittance at 200-hour irradiated part | Light-transmittance at 400-hour irradiated part | Appearance |
|---|---|---|---|---|
| Example 1 | 16% | 20% | 28% | ○ |
| Example 2 | 16% | 19% | 24% | ◎ |
| Comparative Example | 16% | 26% | 41% | x |

On the transfer products of Examples 1, 2 and Comparative Example, a light resistance test was carried out under the condition of an 83° C. black panel by using a carbon-arc fadeometer. For each of the transfer products, the degree of light transmission was measured at masked part, 200-hour irradiated part, and 400-hour irradiated part (Table 1). The degree of light transmission in Comparative Example increased by 10% at the 200-hour irradiated part, and by as much as 25% at the 400-hour irradiated part, as compared with the masked part. The increase in the degree of light transmission could be attributed to a fading of the expression layer. By contrast to this, the degree of light transmission in Example 1 increased by 4% at the 200-hour irradiated part and by 12% at the 400-hour irradiated part, as compared with the masked part. The degree of light transmission in Example 2 increased by 3% at the 200-hour irradiated part and by 8% at the 400-hour irradiated part, as compared with the masked part. From these results, it was found that the transfer products of Example 1 and Example 2 were able to be prevented from the fading of the expression layer, as compared with Comparative Example. According to appearence test of the Example 1, Example 2, and Comparative Example after the experiment, the Example 2 is best, the Example 1 is better, the Comparative Example is colorless and transparent because of the significant fading of the expression layer.

The ultraviolet absorbing layer of the invention is significantly high in the ultraviolet absorption rate because it contains an acrylic high polymer in which a skeleton having an ultraviolet absorbing property is introduced to molecular chains. Accordingly, the transfer material and transfer product of the invention have enough light resistance.

Also, since the skeleton having an ultraviolet absorbing property is introduced as molecular chains of the acrylic high polymer, the ultraviolet absorbing layer is very stable and almost free from variation with time. Thus, the transfer material and transfer product of the invention may prevent any variation in the ultraviolet absorption rate or layer separation with time.

Furthermore, the ultraviolet absorbing layer of the invention is excellent in heat resistance because it contains an acrylic high polymer in which a skeleton having an ultraviolet absorbing property is introduced to molecular chains. Accordingly, in the transfer material of the invention, the ultraviolet absorbing layer may prevent the ultraviolet absorbing function from losing due to the heating during the transfer process or the resin molding process.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A transfer material comprising (1) a substrate sheet having mold-releasability and (2) a transfer layer on the substrate sheet, wherein the transfer layer comprises (a) an ultraviolet absorbing layer containing an acrylic polymer in which a skeleton having an ultraviolet absorbing property is introduced into the polymer chain, and (b) an expression layer for expressing at least one member selected from the group consisting of characters, figures, patterns and colors, wherein the substrate sheet comprises a main body and a release aided layer, the ultraviolet absorbing layer is provided on the release aided layer of the substrate sheet, and said transfer material further comprises:

a matte layer provided at a part of the ultraviolet absorbing layer on a side of the substrate sheet and having a surface processed part;

an anchor layer formed at a whole surface of the ultraviolet absorbing layer on a side opposite to a side of the substrate sheet, wherein the expression layer is partially provided on the anchor layer; and an adhesive layer provided on the expression layer and provided on the anchor layer at a portion where the expression layer is not present, wherein the expression layer comprises a pattern layer; a metallic pigment containing layer; a smoky layer; or a metallic vaporized layer.

2. A transfer material comprising (1) a substrate sheet having mold-releasability and (2) a transfer layer on the substrate sheet, wherein the transfer layer comprises (a) an ultraviolet absorbing layer containing an acrylic polymer in which a 2-hydroxybenzophenone skeleton having an ultraviolet absorbing property is introduced into the polymer chain, and (b) an expression layer for expressing at least one member selected from the group consisting of characters, figures, patterns and colors, wherein the substrate sheet comprises a main body and a release aided layer, the ultraviolet absorbing layer is provided on the release aided layer of the substrate sheet, and said transfer material further comprises:

a matte layer provided at a part of the ultraviolet absorbing layer on a side of the substrate sheet and having a surface processed part;

an anchor layer formed at a whole surface of the ultraviolet absorbing layer on a side opposite to a side of the substrate sheet, wherein the expression layer is partially provided on the anchor layer; and an adhesive layer provided on the expression layer and provided on the anchor layer at a portion where the expression layer is not present, wherein the expression layer comprises a pattern layer; a metallic pigment containing layer; a smoky layer; or a metallic vaporized layer.

3. A transfer material comprising (1) a substrate sheet having mold-releasability and (2) a transfer layer on the substrate sheet, wherein the transfer layer comprises (a) an ultraviolet absorbing layer containing an acrylic polymer in which a 2-hydroxybenzophenone skeleton having an ultraviolet absorbing property selected from the group consisting of 2-hydroxy-4-(methacryloyloxyethoxy)benzophenone, 2-hydroxy-4-methacryloyloxybenzophenone, and 2-hydroxy-4-(2-hydroxy-3-methacryloyloxy) propoxybenzophenone is introduced into the polymer chain, and (b) an expression layer for expressing at least one member selected from the group consisting of characters, figures, patterns and colors, wherein the substrate sheet comprises a main body and a release aided layer, the ultraviolet absorbing layer is provided on the release aided layer of the substrate sheet, and said transfer material further comprises:

a matte layer provided at a part of the ultraviolet absorbing layer on a side of the substrate sheet and having a surface processed part;

an anchor layer formed at a whole surface of the ultraviolet absorbing layer on a side opposite to a side of the substrate sheet, wherein the expression layer is partially provided on the anchor layer; and an adhesive layer provided on the expression layer and provided on the anchor layer at a portion where the expression layer is not present, wherein the expression layer comprises a pattern layer; a metallic pigment containing layer; a smoky layer; or a metallic vaporized layer.

4. A transfer material comprising (1) a substrate sheet having mold-releasability and (2) a transfer layer on the substrate sheet, wherein the transfer layer comprises (a) an ultraviolet absorbing layer containing an acrylic polymer in which a skeleton having an ultraviolet absorbing property is introduced into the polymer chain, and (b) an expression layer for expressing at least one member selected from the group consisting of characters, figures, patterns and colors, wherein the substrate sheet comprises a main body and a release aided layer, and said transfer material further comprises:

a release layer provided on the release aided layer of the substrate sheet;

a matte layer provided at a part of the release layer on a side of the substrate sheet and having a surface processed part;

a hard coating layer provided on the release layer;

an anchor layer provided on the hard coating layer, wherein the ultraviolet absorbing layer is partially provided on the anchor layer, and the expression layer is partially provided on the ultraviolet absorbing layer and partially provided on the anchor layer at a portion where the ultraviolet absorbing layer is not present; and an adhesive layer provided on the expression layer and provided on the anchor layer or the ultraviolet absorbing layer at a portion where the expression layer is not present, wherein the expression layer comprises an anchor layer provided on a whole surface of the hard coating layer; a first pattern layer provided on a part of the anchor layer at a portion corresponding to the surface processed part of the matte layer; a second pattern layer provided on a part of the ultraviolet absorbing layer provided on a part of the anchor layer; or a smoky layer provided on a part of the ultraviolet absorbing layer provided on a part of the anchor layer.

5. A transfer material comprising (1) a substrate sheet having mold-releasability and (2) a transfer layer on the substrate sheet, wherein the transfer layer comprises (a) an ultraviolet absorbing layer containing an acrylic polymer in which a 2-hydroxybenzophenone skeleton having an ultraviolet absorbing property is introduced into the polymer chain, and (b) an expression layer for expressing at least one member selected from the group consisting of characters, figures, patterns and colors, wherein the substrate sheet comprises a main body and a release aided layer, and said transfer material further comprises:

a release layer provided on the release aided layer of the substrate sheet;

a matte layer provided at a part of the release layer on a side of the substrate sheet and having a surface processed part;

a hard coating layer provided on the release layer;

an anchor layer provided on the hard coating layer, wherein the ultraviolet absorbing layer is partially provided on the anchor layer, and the expression layer is partially provided on the ultraviolet absorbing layer and partially provided on the anchor layer at a portion where the ultraviolet absorbing layer is not present; and an adhesive layer provided on the expression layer and provided on the anchor layer or the ultraviolet absorbing layer at a portion where the expression layer is not present, wherein the expression layer comprises an anchor layer provided on a whole surface of the hard coating layer; a first pattern layer provided on a part of the anchor layer at a portion corresponding to the surface processed part of the matte layer; a second pattern layer provided on a part of the ultraviolet absorbing layer provided on a part of the anchor layer; or a smoky layer provided on a part of the ultraviolet absorbing layer provided on a part of the anchor layer.

6. A transfer material comprising (1) a substrate sheet having mold-releasability and (2) a transfer layer on the substrate sheet, wherein the transfer layer comprises (a) an ultraviolet absorbing layer containing an acrylic polymer in which a 2-hydroxybenzophenone skeleton having an ultraviolet absorbing property selected from the group consisting of 2-hydroxy-4-(methacryloyloxyethoxy)benzophenone, 2-hydroxy-4-methacryloyloxybenzophenone, and 2-hydroxy-4-(2-hydroxy-3-methacryloyloxy)

propoxybenzophenone is introduced into the polymer chain, and (b) an expression layer for expressing at least one member selected from the group consisting of characters, figures, patterns and colors, wherein the substrate sheet comprises a main body and a release aided layer, and said transfer material further comprises:

a release layer provided on the release aided layer of the substrate sheet;

a matte layer provided at a part of the release layer on a side of the substrate sheet and having a surface processed part;

a hard coating layer provided on the release layer;

an anchor layer provided on the hard coating layer, wherein the ultraviolet absorbing layer is partially provided on the anchor layer, and the expression layer is partially provided on the ultraviolet absorbing layer and partially provided on the anchor layer at a portion where the ultraviolet absorbing layer is not present; and an adhesive layer provided on the expression layer and provided on the anchor layer or the ultraviolet absorbing layer at a portion where the expression layer is not present, wherein the expression layer comprises an anchor layer provided on a whole surface of the hard coating layer; a first pattern layer provided on a part of the anchor layer at a portion corresponding to the surface processed part of the matte layer; a second pattern layer provided on a part of the ultraviolet absorbing layer provided on a part of the anchor layer; or a smoky layer provided on a part of the ultraviolet absorbing layer provided on a part of the anchor layer.

7. A transfer material comprising (1) a substrate sheet having mold-releasability and (2) a transfer layer on the substrate sheet, wherein the transfer layer comprises (a) an ultraviolet absorbing layer containing an acrylic polymer in which a skeleton having an ultraviolet absorbing property is introduced into the polymer chain, and (b) an expression layer for expressing at least one member selected from the group consisting of characters, figures, patterns and colors, wherein the substrate sheet is surface-processed on its whole surface, and said transfer material further comprises:

a release layer provided on the substrate sheet, wherein the ultraviolet absorbing layer is provided on the release layer;

a pre-anchor layer on the ultraviolet absorbing layer, wherein the expression layer is partially provided on the pre-anchor layer;

a post-anchor layer provided on the expression layer and provided on the pre-anchor layer at a portion where the expression layer is not present; and an adhesive layer provided on the post-anchor layer, wherein the expression layer comprises a pattern layer; a metallic pigment containing layer; a smoky layer; or a metallic vaporized layer.

8. A transfer material comprising (1) a substrate sheet having mold-releasability and (2) a transfer layer on the substrate sheet, wherein the transfer layer comprises (a) an ultraviolet absorbing layer containing an acrylic polymer in which a 2-hydroxybenzophenone skeleton having an ultraviolet absorbing property is introduced into the polymer chain, and (b) an expression layer for expressing at least one member selected from the group consisting of characters, figures, patterns and colors, wherein the substrate sheet is surface-processed on its whole surface, and said transfer material further comprises:

a release layer provided on the substrate sheet, wherein the ultraviolet absorbing layer is provided on the release layer;

a pre-anchor layer on the ultraviolet absorbing layer, wherein the expression layer is partially provided on the pre-anchor layer;

a post-anchor layer provided on the expression layer and provided on the pre-anchor layer at a portion where the expression layer is not present; and an adhesive layer provided on the post-anchor layer, wherein the expression layer comprises a pattern layer; a metallic pigment containing layer; a smoky layer; or a metallic vaporized layer.

9. A transfer material comprising (1) a substrate sheet having mold-releasability and (2) a transfer layer on the substrate sheet, wherein the transfer layer comprises (a) an ultraviolet absorbing layer containing an acrylic polymer in which a 2-hydroxybenzophenone skeleton having an ultraviolet absorbing property selected from the group consisting of 2-hydroxy-4-(methacryloyloxyethoxy)benzophenone, 2-hydroxy-4-methacryloyloxybenzophenone, and 2-hydroxy-4-(2-hydroxy-3-methacryloyloxy)propoxybenzophenone is introduced into the polymer chain, and (b) an expression layer for expressing at least one member selected from the group consisting of characters, figures, patterns and colors, wherein the substrate sheet is surface-processed on its whole surface, and said transfer material further comprises:

a release layer provided on the substrate sheet, wherein the ultraviolet absorbing layer is provided on the release layer;

a pre-anchor layer on the ultraviolet absorbing layer, wherein the expression layer is partially provided on the pre-anchor layer;

a post-anchor layer provided on the expression layer and provided on the pre-anchor layer at a portion where the expression layer is not present; and an adhesive layer provided on the post-anchor layer, wherein the expression layer comprises a pattern layer; a metallic pigment containing layer; a smoky layer; or a metallic vaporized layer.

10. A transfer material comprising (1) a substrate sheet having mold-releasability and (2) a transfer layer on the substrate sheet, wherein the transfer layer comprises (a) an ultraviolet absorbing layer containing an acrylic polymer in which a skeleton having an ultraviolet absorbing property is introduced into the polymer chain, and (b) an expression layer for expressing at least one member selected from the group consisting of characters, figures, patterns and colors, further comprising:

a release layer provided on the substrate sheet;

a pre-anchor layer provided on the release layer, wherein the expression layer is partially provided on the pre-anchor layer; and a post-anchor layer provided on the expression layer and provided on the pre-anchor layer at a portion where the expression layer is not present, wherein the ultraviolet absorbing layer is provided on the post-anchor layer and has an adhesive property, and the expression layer comprises a pattern layer or a metallic vaporized layer.

11. A transfer material comprising (1) a substrate sheet having mold-releasability and (2) a transfer layer on the substrate sheet, wherein the transfer layer comprises (a) an ultraviolet absorbing layer containing an acrylic polymer in which a 2-hydroxybenzophenone skeleton having an ultraviolet absorbing property is introduced into the polymer chain, and (b) an expression layer for expressing at least one member selected from the group consisting of characters, figures, patterns and colors, further comprising:

a release layer provided on the substrate sheet;

a pre-anchor layer provided on the release layer, wherein the expression layer is partially provided on the pre-anchor layer; and a post-anchor layer provided on the expression layer and provided on the pre-anchor layer at a portion where the expression layer is not present, wherein the ultraviolet absorbing layer is provided on the post-anchor layer and has an adhesive property, and the expression layer comprises a pattern layer or a metallic vaporized layer.

12. A transfer material comprising (1) a substrate sheet having mold-releasability and (2) a transfer layer on the substrate sheet, wherein the transfer layer comprises (a) an ultraviolet absorbing layer containing an acrylic polymer in which a 2-hydroxybenzophenone skeleton having an ultraviolet absorbing property selected from the group consisting of 2-hydroxy-4-(methacryloyloxyethoxy)benzophenone, 2-hydroxy-4-methacryloyloxybenzophenone, and 2-hydroxy-4-(2-hydroxy-3-methacryloyloxy)propoxybenzophenone is introduced into the polymer chain, and (b) an expression layer for expressing at least one member selected from the group consisting of characters, figures, patterns and colors, further comprising:

a release layer provided on the substrate sheet;

a pre-anchor layer provided on the release layer, wherein the expression layer is partially provided on the pre-anchor layer; and a post-anchor layer provided on the expression layer and provided on the pre-anchor layer at a portion where the expression layer is not present, wherein the ultraviolet absorbing layer is provided on the post-anchor layer and has an adhesive property, and the expression layer comprises a pattern layer or a metallic vaporized layer.

* * * * *